US005780568A

United States Patent [19]
Vuorenpaa et al.

[11] Patent Number: 5,780,568
[45] Date of Patent: Jul. 14, 1998

[54] STARCH DERIVATIVES GRAFTED WITH ALIPHATIC POLYESTER, PROCEDURE FOR THEIR PRODUCTION AND THEIR USE

[75] Inventors: Jani Vuorenpaa, Helsinski; Soili Peltonen, Rajamaki; Jukka Seppala, Helsinski, all of Finland

[73] Assignee: Valtion Teknillinen Tutkimuskeskus, Finland

[21] Appl. No.: 716,433

[22] PCT Filed: Mar. 21, 1995

[86] PCT No.: PCT/FI95/00148

§ 371 Date: Nov. 27, 1996

§ 102(e) Date: Nov. 27, 1996

[87] PCT Pub. No.: WO95/25750

PCT Pub. Date: Sep. 28, 1995

[30] Foreign Application Priority Data

Mar. 21, 1994 [FI] Finland .................... 941318

[51] Int. Cl.$^6$ .................... C08B 31/02; C08G 63/08; C09J 103/06; D21H 17/28
[52] U.S. Cl. .................... 527/300; 527/305; 527/315; 525/54.24
[58] Field of Search .................... 527/300, 305, 527/315; 525/54.24, 54.2

[56] References Cited

U.S. PATENT DOCUMENTS 5,540,929 7/1996 Narayan et al. .................... 424/422

FOREIGN PATENT DOCUMENTS 0204353 12/1986 European Pat. Off. .
WO92/19680 11/1992 WIPO .

OTHER PUBLICATIONS

Koenig et al, Polymeric Materials Sci. Engineering, vol. 67, pp. 290–291 (1992).

Tanna et al, Polymeric Materials Sci. Engineering, vol. 67, pp. 294–295 (1992).

Patent Abstracts of Japan, vol. 17, No. 492, C–1107, Abstract of JP. A. 5-125101 (1993).

Chem. Abstracts, 117(10): 91588w (1993), Abstract of JP 04093315 A2 (1992).

*Primary Examiner*—Nathan M. Nutter
*Attorney, Agent, or Firm*—Birch, Stewart, Kolasch & Birch, LLP

[57] ABSTRACT

The invention relates to a procedure, to a grafted starch derivative produced by this procedure and method of using it. In the procedure a starch or starch derivative is graft-copolymerized with a cyclic ester, producing a starch derivative grafted with an aliphatic polyester. The procedure can be implemented as mass polymerization without the use of a solvent or other medium. The grafted starch derivative produced can be used as a component in hot-melt adhesives and as an impermeable coating for paper and cardboard.

26 Claims, No Drawings

STARCH DERIVATIVES GRAFTED WITH ALIPHATIC POLYESTER, PROCEDURE FOR THEIR PRODUCTION AND THEIR USE

The present invention relates to a procedure for producing a grafted starch derivative. The invention also relates to products manufactured using this procedure and to their use.

Manufacture of a graft copolymer from corn starch and ε-caprolactone is partly known. Patent JP 04093315 describes a method for grafting native corn starch with poly-ε-caprolactone (PCL) by preconditioning the poly-ε-caprolactone with methyldicyanate and triethylamide in a toluene solution prior to the addition of native corn starch. Moreover, patent JP 05125101 describes graft copolymerization of starch with ε-caprolactone in a dimethyl acetamide solution in the presence of triethylamine and lithium chloride. Other literature relating to aliphatic polyesters deals with compounding of the above-mentioned substances. A drawback with the methods described is the use of solvents detrimental to health.

To reduce the price of aliphatic polyesters and to improve their biodegradability, they have been blended with polymers obtained from renewable natural resources, such as starch. Compounding of the polymers mentioned above can be achieved by currently known methods (described e.g. in patent PCL/EP92/00959 and in articles: Koenig, M. F. and Huang, S. J., Biodegradable Polymer/Starch Blends, Composites and Coating, *Polymer. Mater. Sci. Eng.*, 67, 1992, pp. 290–291 and McCarthy, S. P., Tanna, S. T. and Gross, R., Biodegradation of Blends of Bacterial Polyester and Starch in a Compost Environment, *Polym. Mater. Sci. Eng.*, 67, 1992, pp. 294–295), but the mechanical properties of polymer blends obtained by compounding deteriorate rapidly as the starch content increases. In addition to the deterioration of mechanical properties, the use of starch also increases the hydrophilicity of the product, thus reducing its water resistance. Therefore, the product is structurally unsatisfactory for many present-day applications.

In view of the circumstances described above, it is desirable to find new methods for producing hydrophobic, biodegradable products having a good water resistance and mechanical properties adequate for their applications.

With the starch derivatives grafted with an aliphatic polyester produced by the procedure of the invention, the properties described above can be achieved and the drawbacks avoided. In the procedure of the invention, starch or a starch derivative can be graft-copolymerized without a catalyst or with the aid of a suitable ring-opening catalyst with a cyclic, ring-structured ester monomer, hereinafter simply referred to as cyclic ester, which, as a result of polymerization, forms aliphatic polyester grafts in the starch or starch derivative.

In the procedure of the invention, a starch derivative grafted with aliphatic polyesters can, in optimal conditions, be manufactured without a solvent or other medium. The fact that aliphatic polyesters are grafted in starch or a starch derivative has been established by a FTIR analysis.

The procedure of the invention produces a hydrophobic product which can be used as a hot-melt adhesive component and which can partly or completely replace the commonly used non-biodegradable polymers.

The products of the invention are characterized in that they are water insoluble, hydrophobic, have a low melting point and a low water transmission.

Products manufactured by the procedure of the invention can also be used for the coating of paper or cardboard to increase the water resistance and reduce the water transmission of paper or cardboard.

The invention is described in greater detail by the aid of the following application examples. These represent typical ways of producing and using the product of the invention. The application examples are only intended to demonstrate the invention without limiting the scope of protection of the invention in any way.

The starch described in the invention may be any starch extracted from a natural raw material (true starch), e.g. barley, potato, wheat, oat, corn, tapioca, sago, rice or other tuber or grain based starch with an amylose content of 0–100% and an amylopectin content of 100–0%. The starch derivative may be an alkoxylated starch, e.g. hydroxyethyl or hydroxypropyl starch, an esterified starch, e.g. starch acetate, a chemically or enzymatically hydrolyzed starch, an oxygenated starch or a carboxymethylated starch.

The ring-opening catalyst described in the invention may be any catalyst used in ring-opening polymerization of a cyclic ester, such as an organometallic compound of aluminum, stannum or zinc. Usable aluminum compounds are aluminum alkoxides, alkylated aluminums and alkylated aluminum polyalkoxides, such as diethylaluminum methoxide, diethylaluminum allyloxide, aluminum isopropoxide, triethylaluminum and aluminum porphyrins. Usable zinc compounds are zinc alkoxides, such as diethylzinc ethoxybromide and diethylzinc-4-pentenyl-1-oxide. Usable stannous compounds are stannous halides, derivatives of tributyltin and triphenyltin, such as stannous chloride, bromide and iodide, tributyltin methoxide, triphenyltin acetate and stannous octoate.

In the procedure of the invention, the catalyst content in graft copolymerization may be 0–5 w-% (percent by weight) of the cyclic ester, suitably 0.05–5 w-%, preferably 0.5 w-%.

In the procedure described in the invention, the starch or starch derivative can be graft-copolymerized with cyclic esters even without a ring-opening catalyst.

The grafted aliphatic polyester described in the invention may be a polyester derived by graft-copolymerization from any cyclic ester. Among cyclic esters, the most usable are lactones of various ring sizes, such as 4-ring γ-butyrolactone, 5-ring δ-valerolactone and 6-ring ε-caprolactone.

In the procedure of the invention, a cyclic ester is allowed to react with starch or a starch derivative without a medium in a mass polymerization process, producing a starch derivative grafted with a polyester and having an aliphatic polyester content of at least 26%, suitably 80%, preferably 67%.

The reagents used; the starch or starch derivative, ring-opening catalyst and cyclic ester need not be dehydrated or specially dried, but unnecessary moisture should be avoided because it may prevent graft-copolymerization of the starch or starch derivative with the cyclic ester.

In the procedure described in the invention, oxygen inhibiting the polymerization of aliphatic polyesters is eliminated by performing the polymerization in a nitrogen atmosphere.

In the procedure described in the invention, the reaction temperature may be 100°–200° C., suitably 120°–180° C., preferably 150°–180° C. The reaction time may be 3–12 hours, suitably 6–12 hours. A suitable reaction time is 3 hours when the reaction temperature is 180° C., a preferable reaction time is 6 hours when the reaction temperature is 150° C.

The product obtained by the procedure of the invention is a starch derivative grafted with aliphatic polyesters, having an aliphatic polyester content of at least 26%, suitably 80%, preferably 67%.

A basic rule for the manufacture is as follows:

The cyclic ester, ring-opening catalyst and starch or starch derivative are allowed to react in a container placed in an oil bath under a reaction temperature of 150° C. while stirring the reaction mixture. After a reaction time of 6 hours, the product is placed in a receptacle in the liquid condition. The mass relationship between the reagents is so chosen that the proportion of aliphatic polyester in the grafted starch derivative obtained as a product of the graft-copolymerization reaction is in the range of 26%–80%. Alternatively, the reaction can be implemented without a catalyst.

The grafted starch derivative produced by the procedure of the invention is a product suited for use as a hot-melt adhesive component. Hot-melt adhesives often consist of three main components: a thermoplastic polymer, adhesive resin and wax. Besides these, small amounts of various additives are used for adjustment of the properties. The commonest adhesive resins used in hot-melt adhesives are derivatives of pine oil resin or hydrocarbon resins. The thermoplastic polymers are polyolefins (polyethylene, polypropylene), ethylene vinyl acetate copolymers, styrene-butadiene-styrene or styrene-isoprene-styrene block copolymers. The most commonly used waxes are synthetic PE waxes. In other words, most of the raw materials of hot-melt adhesives are products of the petrochemical industry.

The products manufactured by the procedure of the invention are made of raw materials based on biodegradable or renewable natural resources. They are starch derivatives grafted with aliphatic polyesters and have properties that meet the requirements applying to raw materials of hot-melt adhesives. They can be used to replace polymers based on products of the petrochemical industry and employed in hot-melt adhesives. The products are water insoluble, hydrophobic grafted starch derivatives having a low melting point and an aliphatic polyester content of at least 26%, suitably 80%, preferably 67%.

The starch polymer derivatives described above can be used as components in hot-melt adhesives containing polyolefins, resins and waxes. Their applicability for this use has not been previously described.

Hot-melt adhesives are generally manufactured by melting the raw materials in a high temperature, generally 150°–200° C. Due to this manufacturing process, the raw materials of hot-melt adhesives must have a melting point not exceeding the process temperature, preferably below 150° C. Because of the high process temperatures, the raw materials must have sufficiently stable melt viscosity values to ensure that the properties of the adhesive being manufactured will not change during manufacture and storage. In addition, since hot-melt adhesives are generally mixtures of several components, their raw materials must have a good intermixing capability. The grafted starch derivative of the invention meets these requirements. These grafted starch derivatives have melting points clearly below the process temperatures, which is an advantage from the viewpoint of energy saving as well. Besides having advantageous melting characteristics, the grafted starch derivatives mix well with the raw materials generally used in hot-melt adhesives and have a sufficient viscosity stability for this application, too, as demonstrated by Example 8.

The applicability of a grafted starch derivative manufactured by the procedure of the invention as a component of hot-melt adhesives has also been investigated by preparing hot-melt adhesive formulations from it and measuring the tenacity properties of the adhesive obtained (Example 9). The properties are compared to "standard formulations" commonly used in this field, which consist of a thermoplastic polymer, e.g. ethylene vinyl acetate (EVA), adhesive resin and wax. In Example 9, EVA is partly or completely replaced with a grafted starch derivative. By comparing the tensile strength values of adhesive mixtures containing grafted starch with those of so-called standard adhesive mixtures, it can be seen that the values are of the same order, which further confirms the applicability of the product of the invention as a raw material for hot-melt adhesives.

The invention relates to a hydrophobic product with a low melting point, applicable for use in hot-melt adhesives, blending with thermoplastic polymers such as polyolefins, ethylene vinyl acetate copolymers (EVA), styrene-butadiene-styrene block copolymers (SBS), styrene-isoprene-styrene block copolymers (SIS) and resins (such as hydrocarbon resins, terpene resins and pine oil based resins) and consisting of a starch derivative grafted with aliphatic polyesters and containing a proportion of aliphatic polyesters as defined above.

The properties of the product of the invention vary depending on the length of the grafted aliphatic polyester chain and the amount of polyester. As the proportion of polyester in the product increases, its water-solubility decreases. The product has an emollescence temperature in the range of 30°–90° C., which is significant in respect of processibility. As a general rule, the lower the emollescence temperature, the better the processibility of the product.

The hydrophobic, water insoluble and impermeable product described in the invention can also be used as a coating material for paper and cardboard to improve the water resistance of said fibre based products and to reduce their water transmission. The applicability of grafted starch derivatives for these uses has not been previously described.

That grafted starch derivatives manufactured by the procedure of the invention can be applied to improve the water resistance of paper or cardboard was demonstrated by coating cardboard with the product of the invention and comparing the water absorption capability of coated cardboard with the corresponding properties of uncoated cardboard. The results presented in Example 10 show that the absorption of water into cardboard is reduced to about one tenth when the cardboard is coated with the product of the invention.

EXAMPLE 1

Grafting true starch with $\epsilon$-caprolactone with the aid of stannous octoate (150° C., 6 hours)

The starch used was native barley starch. Graft-copolymerization was implemented using $\epsilon$-caprolactone in the presence of stannous octoate as catalyst.

In the laboratory experiments, the following basic formula was used, yielding a final product with an aliphatic polyester content of about 67% of the total amount of the product.

1 26.3 g of native starch (as dry matter)
2 50.0 g of $\epsilon$-caprolactone
3 0.25 g of stannous octoate The reaction was carried out by mixing in an oil bath at a reaction temperature of 150° C. The reaction time was 6 hours. After the reaction, the product was cooled down and the conversion of $\epsilon$-caprolactone was determined by heating a sample of the product at 105° C. for 3 hours. The conversion was determined from the amount evaporated from the sample. In different laboratory experiments, the conversion of $\epsilon$-caprolactone varied between about 8–99%. Conversion measurement is used to establish the amount of inert $\epsilon$-caprolactone in the reaction product. For instance, the value 97% means that the inert $\epsilon$-caprolactone content of the reaction product is 3%. In the present example, the conversion of $\epsilon$-caprolactone was 96.2%.

EXAMPLE 2

Grafting a starch derivative with ε-caprolactone with the aid of stannous octoate (150° C., 6 hours)

The starch derivative used for graft-copolymerization was hydroxypropylated starch with a molecular substitution level of about 2.2. Graft-copolymerization was implemented using ε-caprolactone in the presence of stannous octoate as catalyst.

The following basic formula was used in the laboratory experiments.
1  24.9 g of hydroxypropyl starch
2  50.0 g of ε-caprolactone
3  0.25 g of stannous octoate The reaction was carried out by mixing in an oil bath at a reaction temperature of 150° C. The reaction time was 6 hours. The conversion of ε-caprolactone was 97.3% and the emollescence temperature of the product was 45.6° C.

EXAMPLE 3

Grafting a starch derivative with ε-caprolactone with the aid of stannous octoate (180° C., 3 hours)

Graft-copolymerization of the starch derivative was carried out by varying the basic formula presented in Example 2 by raising the temperature to 180° C. and reducing the reaction time to 3 hours. The conversion of ε-caprolactone was 95.2% and the emollescence temperature of the product was 48.2° C.

EXAMPLE 4

Grafting a starch derivative with ε-caprolactone with the aid of stannous octoate (100° C., 12 hours)

Graft-copolymerization of the starch derivative was carried out by varying the basic formula presented in Example 2 by reducing the temperature to 100° C. and increasing the reaction time to 12 hours. The conversion of ε-caprolactone was 99.1% and the emollescence temperature of the product was 51.5° C.

EXAMPLE 5

Varying the proportion of aliphatic polyester in graft-copolymerization of a starch derivative with ε-caprolactone in the presence of stannous octoate The reaction was carried out as in Example 2 but using varying amounts of starch derivative (1), ε-caprolactone (2) and stannous octoate (3). The amounts of these substances used and the properties of the products obtained are presented in Table 1. Test 5B corresponds to Example 2 presented above.

TABLE 1

Formulas used and properties of the products

| Test | 1 g | 2 g | 3 g | Aliph. pol.est content, w-% | Conversion % | Emoll. temp. °C. | Water solubility, % |
|---|---|---|---|---|---|---|---|
| 5A | 25.0 | 37.4 | 0.125 | 40 | 85.8 | 50.0 | 11.8 |
| 5B | 50.0 | 24.9 | 0.25 | 67 | 97.3 | 45.6 | 5.9 |
| 5C | 50.0 | 12.5 | 0.25 | 180 | 98.5 | 56.9 | 4.2 |

EXAMPLE 6

Grafting a starch derivative with ε-caprolactone with the aid of aluminum isopropoxide (160° C., ½ hour)

The starch derivative used for graft-copolymerization was starch acetate with a substitution level of 0.45. Graft-copolymerization was carried out using ε-caprolactone in the presence of aluminum isopropoxide as catalyst.
1  21.3 g of starch acetate (as dry matter. DS 0.45)
2  45.0 g of ε-caprolactone
3  1.0 g of aluminum isopropoxide The reaction was implemented as in Example 2 but the reaction temperature was 160° C. and the reaction time ½ hour. The conversion of ε-caprolactone was 98.6% and the emollescence temperature of the product was 74.4° C.

EXAMPLE 7

Grafting a starch derivative with ε-caprolactone without a catalyst (150° C., 3 hours)

Graft-copolymerization of the starch derivative was carried out according to the basic formula presented in Example 2 by reducing the reaction time to 3 hours. No catalyst was used in the reaction. The conversion of ε-caprolactone was 99.3% and the emollescence temperature of the product was 37.6° C.

The product showed a greater degree of fluidity than the product obtained in a corresponding manner using a catalyst according to Example 2. Therefore, a product produced with the aid of a catalyst will be harder and more durable than a product manufactured without a catalyst.

EXAMPLE 8

Use of a grafted starch derivative in hot-melt adhesives

This example illustrates the change of viscosity occurring in a grafted starch derivative during storage. The viscosity stability of the grafted starch derivative is tested by melting the starch derivative and storing it in an aging oven at 170° C. A viscosity measurement was performed at daily intervals at a temperature of 160° C. with a Brookfield viscosimeter using the Thermocell heating system (Spindel 28 and 0.6 rpm). The results are presented in Table 2, which shows that, after 4 days of storage, the viscosity falls by 47% of its original value. The allowed maximum change (in the circumstances in question) is often given as 50% by manufacturers of hot-melt adhesives.

TABLE 2

Viscosity stability of hot-melt adhesives

| Time | Viscosity, mPas | Change, % |
|---|---|---|
| After melting | 13400 | 0 |
| 1 day | 10700 | 20 |
| 2 days | 8450 | 37 |
| 3 days | 7230 | 46 |
| 4 days | 7050 | 47 |

EXAMPLE 9

Use of a starch derivative grafted with polylactone in hot-melt adhesives

This example illustrates the properties of a hot-melt adhesive blend containing a starch derivative grafted with polylactone.

As model blends for a hot-melt adhesive, a mixture of EVA (ethylene vinyl acetate copolymer), adhesive resin and wax was used in two different mixture ratios. The adhesives to be studied were prepared by replacing the EVA partly or completely with a grafted starch derivative. Table 3 shows the proportions of different components used in the hot-melt adhesives.

From these mixtures, test pieces about 3 mm in thickness were cast and their tensile strength and break elongation were determined according to the ISO 527 R standard. The results obtained for the test pieces are presented in Table 4.

TABLE 3

Formulas for hot-melt adhesives

| Sample | EVA w-% | Grafted starch derivative, w-% | Resin w-% | Wax w-% |
| --- | --- | --- | --- | --- |
| 1 | — | 45.0 | 45.0 | 10.0 |
| 2 | 22.5 | 22.5 | 45.0 | 10.0 |
| 3 | 45.0 | — | 45.0 | 10.0 |
| 4 | — | 33.3 | 33.3 | 33.3 |
| 5 | 33.3 | — | 33.3 | 33.3 |

TABLE 4

Mechanical properties of hot-melt adhesives

| Sample | Tensile strength MPa | Break elongation % |
| --- | --- | --- |
| 1 | 2.03 ± 0.47 | 9.0 ± 0.8 |
| 2 | 3.16 ± 0.17 | 527 ± 40 |
| 3 | 1.49 ± 0.02 | 430 ± 32 |
| 4 | 2.11 ± 0.39 | 56 ± 18 |
| 5 | 2.22 ± 0.31 | 176 ± 9 |

On an average, the tensile strength values of grafted starch derivatives are of the same order as the strength of the reference adhesives. The strength of adhesives can be varied by changing the mixture ratios (see reference samples 2 and 5).

EXAMPLE 10

Use of a grafted starch derivative for the coating of paper

This example illustrates the water resistance of cardboard coated with a grafted starch derivative. For the testing, a 10*10 cm² piece of uncoated cardboard was coated with a 10 w-% solution of grafted starch derivative which was applied evenly onto the cardboard by means of a roller. The average amount of coating on the cardboard was 20 g/m². After this, 1.0 g of water was placed on the cardboard coated with grafted starch derivative and on an uncoated reference board and the water was allowed to soak. After 15 minutes, unabsorbed water was removed and the amount of water absorbed was determined by weighing. The grafted starch derivative used was a product manufactured according to Example 2. Table 5 presents the results obtained.

TABLE 5

Water resistance of uncoated and coated cardboard

| Test | Amount of coating, g/m² | Water absorbed, % |
| --- | --- | --- |
| 1 | — | 11.4 |
| 2 | 18 | 1.6 |
| 3 | 26 | 0.4 |

The results indicate that the water resistance of cardboard is considerably improved by coating the cardboard and by increasing the amount of coating.

We claim:

1. A procedure for producing a grafted starch derivative, in which procedure a cyclic ester is allowed to react with starch or a starch derivative to form a starch derivative grafted with an aliphatic polyester, wherein a graft-copolymerization is carried out as mass polymerization so that the proportion of aliphatic polyester is at least 26%.

2. The procedure according to claim 1, wherein the proportion of aliphatic polyester in the grafted starch derivative obtained is 67%.

3. The procedure according to claim 1, wherein the graft-copolymerization is implemented as mass polymerization substantially without the use of a solvent or other medium.

4. The procedure according to claim 1, wherein the graft-copolymerization is implemented in the presence of a catalyst.

5. The procedure according to claim 1, wherein the starch is a native starch extracted from a natural raw material.

6. The procedure according to claim 1, wherein the starch derivative is at least one of the following: a) alkoxylated starch, b) esterified starch, c) chemically or enzymatically hydrolyzed starch, d) oxygenated starch or (e) carboxymethylated starch.

7. The procedure according to claim 1, wherein the grafted aliphatic polyester is a straight-chain lactone polymer containing at least one of the following components: a) γ-butyrolactone monomer, b) δ-valerolactone monomer or c) ε-caprolactone monomer.

8. The procedure according to claim 3, wherein the graft-copolymerization is performed in a reaction temperature of 100°–200° C.

9. A grafted starch derivative manufactured by reacting a cyclic ester with starch or a starch derivative to form a starch derivative grafted with an aliphatic polyester wherein a graft-copolymerization is carried out as mass polymerization so that the proportion of aliphatic polyester is at least 26%.

10. The grafted starch derivative according to claim 9, comprising a water insoluble grafted starch derivative having a low water transmission and a low melting point, wherein the proportion of aliphatic polyester in the grafted starch derivative is at least 26%.

11. The crafted starch derivative according to claim 10, wherein the proportion of aliphatic polyester in the product is 67%.

12. The procedure according to claim 1, wherein said proportion of aliphatic polyester does not exceed 80%.

13. The procedure according to claim 4, wherein said catalyst is a catalyst used in ring-opening of cyclic lactone.

14. The procedure according to claim 4, wherein said catalyst is stannous octoate or aluminum isopropoxide.

15. The procedure according to claim 4, wherein the catalyst content in the graft-copolymerization is 0–5 w-% of the cyclic lactone.

16. The procedure according to claim 15, wherein the catalyst content in the graft-copolymerization is 0.05 w-% of the cyclic lactone.

17. The procedure according to claim 16, wherein the catalyst content in the graft-copolymerization is 0.5 w-% of the cyclic lactone.

18. The procedure according to claim 5, wherein said natural raw material comprises barley, potato, wheat, oat, corn, tapioca, sago, rice or other tuber or grain.

19. The procedure according to claim 5, wherein said native starch has an amylose content of 0–100% and an amylopectin content of 100–0%.

20. The procedure according to claim 8, wherein said reaction temperature is 120°–180° C., and the graft-copolymerization is performed in a reaction time of 3–12 hours.

21. The procedure according to claim 20, wherein said reaction temperature is 150°–180° C.

22. The procedure according to claim 20, wherein the reaction time is 6–12 hours.

23. The procedure according to claim 21, wherein the reaction time is 6–12 hours.

24. The grafted starch derivative according to claim 10, wherein the proportion of the aliphatic polyester does not exceed 80%.

25. A method of making hot-melt adhesive comprising adding the graft starch derivative according to claim 9 to a hot melt adhesive.

26. A method of making a paper or cardboard comprising coating a paper or cardboard with the graft starch derivative according to claim 9.

* * * * *